(12) United States Patent
Christiansson

(10) Patent No.: US 9,035,909 B2
(45) Date of Patent: May 19, 2015

(54) TOUCH SURFACE WITH VARIABLE REFRACTIVE INDEX

(75) Inventor: Tomas Christiansson, Torna-Hällestad (SE)

(73) Assignee: FLATFROG LABORATORIES AB, Lund (SE)

( * ) Notice: Subject to any disclaimer, the term of this patent is extended or adjusted under 35 U.S.C. 154(b) by 448 days.

(21) Appl. No.: 13/395,254

(22) PCT Filed: Sep. 9, 2010

(86) PCT No.: PCT/SE2010/050957
§ 371 (c)(1),
(2), (4) Date: Mar. 9, 2012

(87) PCT Pub. No.: WO2011/031215
PCT Pub. Date: Mar. 17, 2011

(65) Prior Publication Data
US 2012/0169672 A1    Jul. 5, 2012

Related U.S. Application Data

(60) Provisional application No. 61/272,321, filed on Sep. 11, 2009.

(30) Foreign Application Priority Data

Sep. 11, 2009 (SE) ...................................... 0950650

(51) Int. Cl.
*G06F 3/042* (2006.01)

(52) U.S. Cl.
CPC .... *G06F 3/0421* (2013.01); *G06F 2203/04109* (2013.01)

(58) Field of Classification Search
CPC ................... G06F 3/0421; G06F 2203/04109; G06F 3/042; G06F 3/0423; G06F 3/0304

USPC ........... 345/173–178; 178/18.09; 353/88–93, 353/97, 98; 359/196.1–236, 577–590
See application file for complete search history.

(56) References Cited

U.S. PATENT DOCUMENTS 3,673,327 A    6/1972    Johnson et al.
4,254,222 A    3/1981    Owen
(Continued)

FOREIGN PATENT DOCUMENTS

EP    1936478    6/2008
JP    60-069728    4/1985
(Continued)

OTHER PUBLICATIONS

International Search Report and Written Opinion dated Dec. 9, 2010 issued in International Application No. PCT/SE2010/050957.

*Primary Examiner* — Ryan A Lubit
*Assistant Examiner* — Lisa Landis
(74) *Attorney, Agent, or Firm* — Harness, Dickey & Pierce, P.L.C.

(57) ABSTRACT

An apparatus for determining a location of at least one object on a touch surface, comprising: a light transmissive panel defining the touch surface and including a controllable reflective boundary; an illumination arrangement configured to introduce light into the panel; a control device configured to selectively control the reflective boundary such that the light may pass between a first layer and a second layer via an opening in the reflective boundary; a light detection arrangement configured to measure the light passed via the opening and impinged on the touch surface; and a processor unit configured to determine the location as a function of the measured light passed via the opening and the selective control of the reflective boundary. A method and computer readable medium is also described.

20 Claims, 5 Drawing Sheets

(56) References Cited

U.S. PATENT DOCUMENTS

| | | |
|---|---|---|
| 6,597,348 B1 | 7/2003 | Yamazaki et al. |
| 6,965,420 B2 | 11/2005 | Li et al. |
| 6,972,753 B1 | 12/2005 | Kimura et al. |
| 7,432,893 B2 | 10/2008 | Ma et al. |
| 2004/0252091 A1 | 12/2004 | Ma et al. |
| 2006/0114237 A1 | 6/2006 | Crockett et al. |
| 2007/0075648 A1 | 4/2007 | Blythe et al. |
| 2008/0007542 A1 | 1/2008 | Eliasson et al. |
| 2008/0150915 A1 | 6/2008 | Shibue et al. |
| 2010/0302210 A1* | 12/2010 | Han et al. ............ 345/175 |
| 2011/0074735 A1 | 3/2011 | Wassvik et al. |

FOREIGN PATENT DOCUMENTS

| | | |
|---|---|---|
| WO | WO 00/11515 | 3/2000 |
| WO | WO 02/054146 | 7/2002 |
| WO | WO 02/065177 | 8/2002 |
| WO | WO 2005/064365 | 7/2005 |
| WO | WO 2008/004103 | 1/2008 |
| WO | WO 2009/048365 | 4/2009 |

* cited by examiner

TOUCH SURFACE WITH VARIABLE REFRACTIVE INDEX

CROSS-REFERENCE TO RELATED APPLICATIONS

The present application claims the benefit of Swedish patent application No. 0950650-2, filed 11 Sep. 2009, and U.S. provisional application No. 61/272,321, filed 11 Sep. 2009, both of which are incorporated herein by reference.

TECHNICAL FIELD

The invention relates to techniques for detecting the location of an object on a touch surface. The touch surface may be part of a touch-sensitive panel.

BACKGROUND ART

To an increasing extent, touch-sensitive panels are being used for providing input data to computers, cell phones, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US 2004/0252091 discloses an alternative technique which is based on frustrated total internal reflection (FTIR). Diverging beams from two spaced-apart light sources is coupled into a panel to propagate inside the panel by total internal reflection. The light from each light source is evenly distributed throughout the entire panel. Arrays of light sensors are located around the perimeter of the panel to detect the light from the light sources. When an object comes into contact with a surface of the panel, the light will be locally attenuated at the point of touch. The location of the object is determined by triangulation based on the attenuation of the light from each source at the array of light sensors.

U.S. Pat. No. 3,673,327 discloses a similar technique also using FTIR in which arrays of light beam transmitters are placed along two edges of a panel to set up a grid of intersecting light beams that propagate through the panel by internal reflection. Corresponding arrays of beam detectors are placed at the opposite edges of the panel. When an object touches a surface of the panel, the beams that intersect at the point of touch will be attenuated. The attenuated beams on the arrays of detectors directly identify the location of the object.

The FTIR techniques described above suffer from being costly, i.a. since they require the use of a large number of detectors and often also a large number of light sources. Furthermore, they are not readily scalable since the required number of detectors/sources increases significantly with the surface area of the panel. Also, the spatial resolution of the panel is dependent on the number of detectors/sources. Still further, the energy consumption for illuminating the panel may be considerable and increases significantly with increasing surface area of the panel.

SUMMARY

It is an object of the invention to at least partly overcome one or more of the above-identified limitations of the prior art. In particular, it is an object to provide a touch sensitive panel with a relatively low number of light emitters and/or detectors.

Hence an apparatus is provided for determining a location of at least one object on a touch surface, the apparatus comprising: a light transmissive panel defining the touch surface and comprising a first layer and a second layer arranged intermediate the touch surface and an opposite surface; a controllable reflective boundary formed between the first layer and the second layer; an illumination arrangement configured to introduce light into the panel for propagation by internal reflection and for allowing the light (L) to impinge on the touch surface; a control device configured to selectively control the reflective boundary for forming a light-transmissive opening in the reflective boundary, such that the introduced light may pass between the first layer and the second layer via the opening; a light detection arrangement configured to receive and measure an intensity of the light passed via the opening and impinged on the touch surface; and a processor unit configured to, when the object touches the touch surface and thereby attenuates the light passed via the opening and impinged on the touch surface, determine the location as a function of the measured light intensity and the selective control of the reflective boundary.

It should be noted that the first layer can be arranged underneath the touch surface and can form the touch surface as well as be arranged underneath one or more other layers that can form the touch surface. Also, the propagation of the light by internal reflection can include propagation of the light by internal reflection in the first layer, in the second layer and/or in additional layers underneath or above the first and second layers.

The light may impinge on the touch surface either before or after it passes the opening, and may pass the opening from the first layer to the second layer or vice versa.

The light-transmissive opening in the reflective boundary may be relatively small in comparison with an extent of the panel, but may also momentarily cover the full panel prior being moved or reduced along a planar direction of the layers. The opening may, as will be described in more detail below, be transferred in various directions of the panel. The transfer of the opening may be regular in terms of direction and speed, but may just as well be performed in an arbitrary manner and/or at a speed that varies over the time.

The light introduced by the illumination arrangement and received by the light detection arrangement is electromagnetic radiation, preferably with a wavelength selected within the range of 10 nm to 1 mm.

In the inventive apparatus, the determining of the location by the processor unit is relatively straight-forward as signals obtained from the measured light intensity and the selective control of the reflective boundary does not interfere in a manner similar with e.g. a location determination based on using measured light intensities in two main directions of the panel. This reduces computational costs which provides for using less expensive components as well as provides for more efficient determination of a number of locations simultaneously present on the touch-surface (multi-touch).

Also and in comparison with many prior art techniques, since the intensity of the light must not necessarily be measured in two directions of the panel, the number of required light emitters and light detectors can be reduced.

For forming the controllable, reflective boundary the first layer may comprise a refractive index different from a refractive index of the second layer. More particularly, the first layer may comprise a lower refractive index than the second layer.

The control device may be configured to form the opening by locally decreasing the difference in refractive indexes of the first layer and the second layer.

The first layer may comprise a variable refractive index, and/or the second layer may comprise a variable refractive index.

More particularly, the opening may be formed by a local increase of the refractive index of the first layer. The opening may also be formed by a local decrease of the refractive index of the second layer, either alone or in combination with an increase of the refractive index of the first layer. However, changing the refractive index of the first layer only may be more advantageous in that any diffusion of light during the internal reflection in the second layer can be reduced, e.g. by using for the second layer a more homogenous material with more constant optical properties.

A reflective layer may be arranged between the first layer and the sec- and layer, for forming the controllable reflective boundary. In this case the reflection can be specular by applying e.g. a coating between the first and second layers, or the reflection can be based on using a polarizing filter that reflects the light.

The control device may be configured to systematically transfer the opening across the touch surface. This is typically done at a certain rate, e.g. at 50-150 Hz and the opening is advantageously transferred from one end of the panel to an opposite end of the panel, such that the opening is transferred under the full touch surface. The plane of the panel is preferably a plane that is parallel with the touch surface of the panel.

The control device may be configured to systematically transfer the opening in a direction parallel with a path of the light from the illumination arrangement to the detection arrangement. This is particularly suitable if the location of the object shall be efficiently determined by using e.g. a time resolved signal obtained by the transfer of the opening and a spatially resolved signal obtained by the detection of the light detection arrangement. The path of light is commonly referred to as the way a beam of light travels in the panel from an incoupling site to an outcoupling site of the panel. The incoupling site typically represents the point(s) of the panel where the light is introduced, while the outcoupling site represents the point(s) of the panel where light exits the panel.

The opening may be elongated and may extend between two opposite sides of the panel. Preferably, the sides between which the opening extends are different from sides of the panel used for the introduction of light and the receiving of the light. Hence, the opening may extend in a direction transverse the path of light.

A width of the elongated opening may be larger than a distance defined by: the distance between the reflective boundary and the touch surface; and an angle between a normal direction of the touch surface and the direction of the light impinged on the touch surface.

The control device may be configured to selectively control the reflective boundary such that a further (i.e. second) light-transmissive opening is formed in the reflective boundary, allowing the light impinged on the touch surface to pass between the first layer and the second layer via the second opening. The second opening can be transferred in the first layer in a manner similar to the transferring of the other (first) opening, and preferably the second opening has the same shape and possibly also the same size as the first opening. The second opening can be transferred in the first layer with a predetermined distance from the first opening.

The processor unit may be configured to determine the location as a function of a momentary location of the opening.

The momentary location of the light-transmissive opening is set by the control device that controls the location of the opening as well as sends to the processor unit information about how the location is set. In other words, the control device continuously sends a signal representing the location of the opening to two units: the reflective boundary, i.e. to the means implementing the reflective boundary, and to the processor unit that determines the location. Of course, as the skilled person realizes, the control device for the opening can be a functional implementation that resides in the processor unit. From this it follows that the processor unit and the control device can be implemented on the same physical processing/control unit.

The panel may comprise a touch layer wherein the first layer and the second layer are arranged underneath the touch layer. Typically the touch layer comprises the touch surface, which provides for more efficient internal reflection of the introduced light as well as improved protection of the panel, e.g. by using a more durable material for the touch layer.

The second layer may be arranged underneath the first layer, the illumination arrangement may be configured to introduce light into the second layer, and the control device may be configured to selectively control the reflective boundary such that the opening allows the light to enter the first layer from the second layer and impinge on the touch surface.

The control device may be configured to selectively control the reflective boundary such that the light impinged on the touch surface is allowed to enter the second layer from the first layer, for further propagation in the second layer and towards the detection arrangement.

The control device may be configured to selectively control the reflective boundary such that the light impinged on the touch surface is allowed to propagate in the first layer and towards the detection arrangement.

The panel may be configured to allow propagation of the light by total internal reflection in the second layer.

According to another aspect of the invention a method in an apparatus is provided for determining a location of at least one object on a touch surface The apparatus comprises a light transmissive panel defining the touch surface, and the panel comprises a first layer and a second layer arranged intermediate the touch surface and an opposite surface, and a controllable reflective boundary formed between the first layer and the second layer. The method comprises the steps of: introducing light into the panel for propagation by internal reflection and for allowing the light to impinge on the touch surface; selectively controlling the reflective boundary for forming a light-transmissive opening in the reflective boundary, such that the introduced light may pass between the first layer and the second layer via the opening; receiving and measuring an intensity of the light passed via the opening and impinged on the touch surface; and determining, when the object touches the touch surface and thereby attenuates the light passed via the opening and impinged on the touch surface, the location as a function of the measured light intensity and the selective control of the reflective boundary.

The inventive method may include functionality implementing any of the features described above in association with the inventive apparatus and shares the corresponding advantages.

Moreover, according to a further aspect of the invention a computer-readable medium is provided, which stores processing instructions that, when executed by a processor, performs the above described method.

Still other objectives, features, aspects and advantages of the invention will appear from the following detailed description, from the attached claims as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
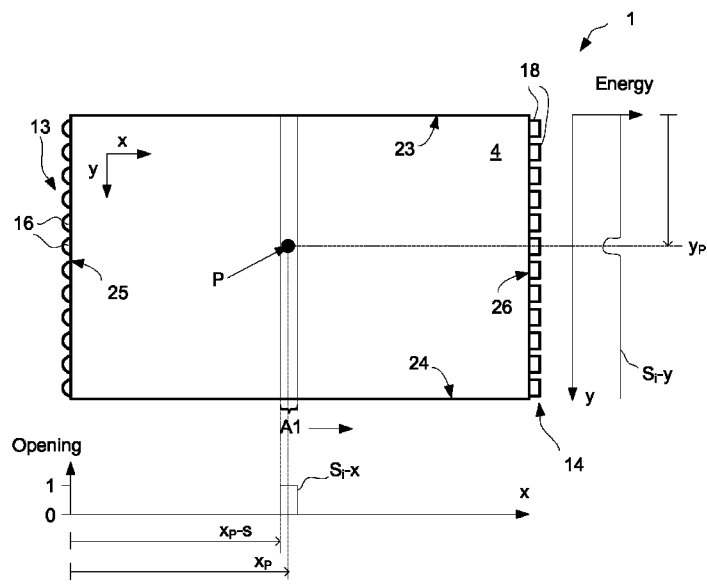
FIG. 1 is a top plan view of an embodiment of a touch-sensing apparatus for determining a location of at least one object on a touch surface.
Figure 2:
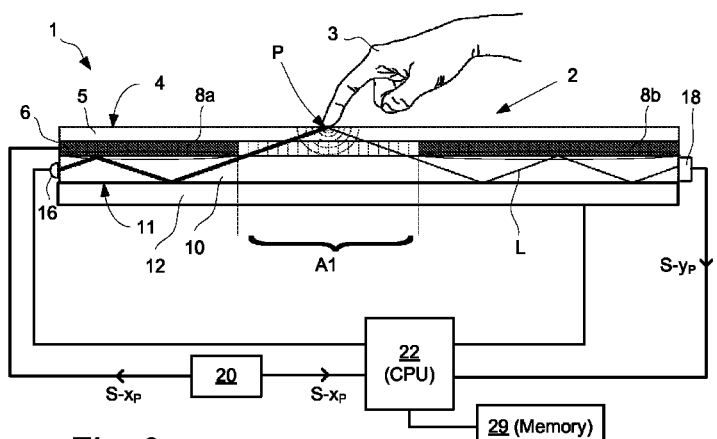
FIG. 2 is a cross sectional view of the apparatus in FIG. 1.

With reference to FIG. 1 and FIG. 2, an embodiment of touch-sensing apparatus 1 for determining a location P of an object 3 that touches a touch surface 4 is illustrated. The touch-sensing apparatus 1 comprises a light-transmissive panel 2 with an upper surface that defines the touch surface 4. More specifically, the panel 2 may be planar or curved and has an upper touch layer 5 defining the touch surface 4, a first layer 6 arranged underneath the touch layer 5, and a second layer 10 arranged underneath the first layer 6 and at its lower side defining an opposite surface 11 generally parallel with the touch surface 4.

In FIG. 1, a Cartesian coordinate system has been introduced, with the x-axis being parallel to a first side 23 and to a second side 24 of the panel 2 while the y-axis is parallel to a third side 25 and to a fourth side 26 of the panel 2. The exemplified panel 2 has a rectangular shape but may just as well be e.g. circular, elliptical or triangular, and another coordinate system such as a polar, elliptic or parabolic coordinate system may be used for describing the location P and various directions in the panel 2.

A reflective boundary 8a, 8b is arranged between the first layer 6 and the second layer 10 for allowing light L to propagate inside the panel 2 by internal reflection in the second layer 10 and between the reflective boundary 8a, 8b and the opposite surface 11, thereby preventing any light from entering the first layer 6 (and the touch layer 5) from the second layer 10. A light-transmissive opening A1 is however formed in the reflective boundary 8a, 8b such that light L may enter the first layer 6 from the second layer via the opening A1, enter the touch layer 5 and impinge on the touch surface 4, as illustrated in FIG. 2. Light impinged on the touch surface 4 is reflected back towards the opposite surface 11 for, again, allowing the light L to propagate inside the second layer 10 by internal reflection between reflective boundary 8b and the opposite surface 11. A control device 20 selectively controls the location of the opening A1 by generating a signal profile $S_t$-x representing the time distributed extent of the opening A1 along the x-direction, e.g. in the form of a time-resolved rectangular function. Thus, the signal profile $S_t$-x exhibits a local increase in signal level at a position $x_P$ along the x-axis that corresponds to the x-position of the opening A1. Typically, the position $x_P$ is the average position of the local increase of $S_t$-x along the x-axis. In some cases when determining the location P, it may however be relevant to use a lower limit $x_P$-s of the signal profile $S_t$-x.

Accordingly, a light propagation channel is provided where either the reflective boundary 8a, 8b or the touch surface 4 forms an upper boundary of the channel while the opposite surface 11 forms the lower boundary of the channel. The control device 20 selectively controls, by virtue of the location of the opening A1, which of the reflective boundary 8a, 8b and the touch surface 4 shall form the upper channel boundary at a certain location in the channel.

When the light L impinges on the touch surface 4, the touch surface 4 allows the light L to interact with the touching object 3, and in the interaction, part of the light L may be scattered by the object 3, part of the light L may be absorbed by the object 3 and part of the light L may continue to propagate unaffected. The scattering and the absorption of light is in combination referred to as attenuation. The interaction between the touching object 3 and the propagating light L typically involve so-called frustrated total internal reflection (FTIR), in which energy of the light L is dissipated into the object 3 from an evanescent wave formed by the propagating light L, provided that the object 3 has a higher refractive index than the material surrounding the touch surface 4 and is placed within less than several wavelengths distance from the touch surface 4.

The internal reflection between the reflective boundary 8a, 8b and the opposite surface 11 is typically caused by total internal reflection (TIR) which is sustained as long as the light L is injected into the panel 2 at an angle to the normal of the panel 2 which is larger than the critical angle at a light-injection site of the panel. The critical angle is governed by the refractive indexes of the material receiving the light at the injection site and the surrounding material, as is well-known to the skilled person. At the location of the opening A1 the light L may for a certain distance propagate by TIR in the x-direction between the touch surface 4 and the opposite surface 11, until the light L again is reflected between the reflective boundary 8a, 8b and the opposite surface 11. Of course, the reflection at the opposite surface 11 can also be specular by arranging a thin layer made of e.g. aluminum acting as a mirror.

The light L is coupled into the panel 2 via an incoupling site 13 of the panel 2 and is coupled out from the panel 2 via an outcoupling site 14. For example and as shown in FIGS. 1 and 2, the light L is coupled into (introduced into) the panel 2 by an illumination arrangement 16 that couples the light L into the second layer 10 at the incoupling site 13 for propagation in the x-direction. The propagated light L is coupled out at outcoupling site 14 and is received by a light detection arrangement 18 that measures the energy of the light at the outcoupling site 14. More specifically, the outcoupling site 14 couples out light from the second layer 10.

The illumination arrangement 16 comprises a set of light emitters while the light detection arrangement 18 comprises a set of light detectors. Each of the light emitters emits light in the form of a beam that is received by an opposite detector, such that the full panel 2 is illuminated, i.e. a sheet of light is created in the x-direction. In this embodiment, the emitters typically are arranged at an edge portion of the second layer 10 and the detectors are arranged at the opposite edge portion the second layer 10. Other techniques for creating a sheet of light in the panel can be used just as well, for example by sweeping a beam of light at a certain frequency along the incoupling site.

The light detectors detects light at the outcoupling site 14 at different spatial locations along the length of the outcoupling site 14, i.e. detects light at the outcoupling site's extension in the y-direction. This detection generates a signal profile $S_i$-y representing the spatial distribution of light at the outcoupling site 14. Accordingly, when the object 3 touches the touch surface 4 and causes an attenuation of the light L, the signal profile $S_i$-y exhibits a local decrease in signal level at a position $y_P$ along the y-axis that corresponds to the y-position of the location P.

As can be seen from FIG. 2, the light L can only be attenuated by the touch when the opening A1 is located such that the light L can impinge on the touch surface 4 at the position of the location P, i.e. when the opening A1 is under the location P. When the opening A1 is located elsewhere (not under the touch), the signal profile $S_i$-y would not exhibit a (sufficiently large) local decrease in signal level, as the object then can not cause any attenuation.

As long as the touch-sensing apparatus 1 is in a mode for detecting touches, a signal S-$y_P$ representing the signal profile $S_i$-y is continuously sent from the light detection arrangement 18 to a processor unit 22 which then can calculate the location P along the y-direction. More specifically, the sending of the signal S-$y_P$ to the processor unit 22 can be implemented by configuring the processor unit 22 to retrieve from the light detection arrangement 18 data representing the spatial distribution of light at the outcoupling site 14, such that the processor unit 22 can generate the signal profile $S_i$-y from the retrieved data. Simultaneously the control device 20 continuously moves the opening A1 in the x-direction by generating and sending to the panel 2 a control signal S-$x_P$ that corresponds to the signal profile $S_i$-x. The same control signal S-$x_P$ is sent to the processor unit 22.

The opening A1 is typically created at the incoupling site 13 and is transferred to the outcoupling site 14 at regular time intervals such as at a frequency of e.g. 50-150 Hz. Exactly which frequency-value shall be employed may depend on what technique is used for coupling the light into the panel. For example, if a technique is used where a beam of light is scanned into the panel along the y-axis at a certain frequency, the frequency of the transferring of the opening can be 20-1000 times greater than the light-scanning frequency.

Each instance the full panel 2 has been illuminated and the opening A1 has been transferred across the panel at least once is referred to as one sensing instance or one iteration (repetitive operation), and each sensing instance includes retrieval of a certain number of signal profiles $S_i$-y which each can be uniquely identified by its index i={1, 2, . . . , n}. The exact number of signal profiles $S_i$-y retrieved during each sensing instance is defined by the number of times the spatial distribution of the opening A1 is changed during that instance. Thus, the rate of the transfer of the opening A1 across the panel 2 also defines the rate at which the signal profiles $S_i$-x, $S_i$-y are retrieved by the processor unit 22.

The transfer of the opening A1 gives a time distributed location of the opening A1, and, as mentioned, the light L is only attenuated when the opening A1 is underneath the location P of the touch, i.e. the signal profile Si-y exhibits a local decrease at $y_P$ the very moment the opening A1 is located at $x_P$. From this it follows that the position of the location P corresponds to or can be derived from $x_P$ in the x-direction, and to $y_P$ in the y-direction when the current $x_P$-value results in the local signal decrease in the $S_i$-y-signal profile, and hence the location P is known.

In other words, the location of the opening A1 is always known since the opening A1 is regularly and repeatedly in a scanner-like manner transferred in the x-direction by the control device 20. When the opening A1 is at a certain position ($x_P$) at a certain moment and the signal profile $S_i$-y exhibits a local decrease at the very same moment, the certain position ($x_P$) then corresponds to the location P of the touch in the x-direction. Accordingly, since the location P of the touch along the y-direction is known from the spatial distribution of light at the outcoupling site 14, the two-dimensional location P of the touch is determined.

The apparatus 1 can also include an interface device 12 for providing a graphical user interface (GUI) within at least part of the panel surface 4. The interface device 12 may be in the form of a substrate with a fixed image that is arranged over, under or within the panel 2. Alternatively, the interface device 12 may be a screen arranged underneath or inside the apparatus 1, or a projector arranged underneath or above the apparatus 1 to project an image onto the panel 2. Such an interface device 12 may provide a dynamic GUI, similar to the GUI provided by a computer screen. The interface device 12 is controlled by a GUI controller, which can be implemented in the processor unit 22, that can determine where graphical objects of the GUI shall be located, for example by using coordinates corresponding to the coordinates for describing the location P of the touch.

Figure 3:
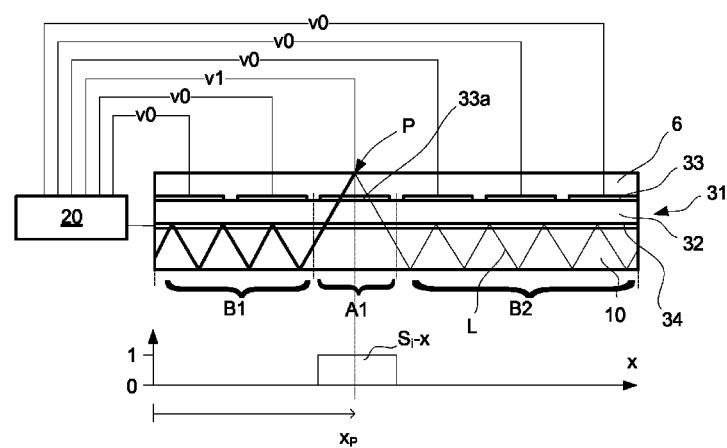
FIG. 3 illustrates a first embodiment of the touch-sensing apparatus, where a reflective layer is used for obtaining the reflective boundary.

With reference to FIG. 3, the reflective boundary 8a, 8b can, for example, be realized by arranging a spectrum controllable reflective polarizer 31, or reflective layer, between the first layer 6 and the second layer 10. The first layer 6 can here define the touch surface even tough it is possible to arrange a touch layer on the first layer 6. The reflective layer 31 comprises a film 32 made from a high molecular weight reactive cholesteric liquid crystal polymer material mixed with conventional low molecular weight liquid crystal(s) and a chiral dopant(s). The film 32 can hence be e.g. a 10 μm thick polarizer, with a bandwidth from 440 nm to 660 nm, and can be switched from a broadband reflection mode (creating a reflective boundary) to a narrow-band transmission mode (creating an opening) by applying an electric field.

The electric field in the film 32 is controlled to vary over the time across the area of the film 32 by the control device 20 acting as a voltage controller, applying varying voltages v0, v1 to segmented electrodes 33 on one side of the film 32 which interact with a base electrode 34 on an opposite side of the film 32. Light L is reflected from various sections of the film 32 so as to generate and control the opening A1 which corresponds to the opening of FIGS. 1 and 2. More precisely, when the opening A1 is to be located at a certain position $x_P$ along the x-direction, a voltage v1 is applied to a specific electrode 33a of the segmented electrodes 33 that spatially corresponds to the location of the opening A1, while no voltage v0 is applied to the remainder of the segmented electrodes 33. The applied voltage results in a light transmissive opening A1 in the film 32 while other sections B1, B2 of the film 32 provide the reflective boundary that allows the light L to propagate between the opposite surface and the reflective boundary.

The voltage v0 must not necessarily be represented by a zero-value but may be any value representing a ground voltage. Depending on the optoelectric material, or on the type of reflective layer in case of the previous embodiment, the function of the voltages v0 and v1 may be changed such that v0 generates the opening while v1 causes the reflective boundary.

Since the spatial distribution of the segmented electrodes 33 is known, applying a voltage to one specific electrode to the next specific electrode in a sequential manner may generate signal profiles like the signal profile $S_i$-x described above, i.e. a signal profile $S_i$-x that exhibits a local increase in signal level at the position $x_P$ along the x-axis that corresponds to the x-position of the specific electrode 33a, and, accordingly, corresponds to the x-position of the opening A1. The segmented electrodes 33 are hence activated by applying voltages such that the above described transfer of the opening A1 is realized.

In this particular embodiment implementing the reflective layer 31, the illumination arrangement 16 introduces into the panel 2 polarized light within the relevant bandwidth of the film 32, such that the boundary B1, B2 and the opening A1 is generated in the panel 2. Each of the electrodes 33, 34 are transparent to the light L and the segmented electrodes 33 have a segmentation that corresponds to the desired width (parallel with the x-direction) of the opening A1, such as 0.5-30 mm.

It is also possible to use segmented electrodes where each of the segmented electrodes is significantly thinner in the x-direction then the opening A1. In this case several of the segmented electrodes may be simultaneously activated so as to generate an opening A1 with the proper extension in the x-direction. The opening A1 may then be transferred by activating a next (in the x-direction) segmented electrode while deactivating the last (along the x-direction) of the activated segmented electrodes.

Preferably, each of the segmented electrodes 33 has a length that corresponds to the height (parallel with the y-direction) of the opening A1, which typically corresponds to the full height of the panel 2. The base electrode 34 can, just like the film 32, be arranged as a sheet covering the full area between the first layer 6 and the second layer 10.

As the skilled person realizes, the are numerous other kinds of controllable reflective layers (polarizing as well as specular) that may be used for generating a reflective boundary with a transferable light-transmissive opening. For purpose of describing such other techniques patent document U.S. Pat. No. 6,965,420 is incorporated by reference.

The reflective boundary 8a, 8b can, in another embodiment, be realized by controlling refractive indexes of e.g. the first layer 6 and/or the second layer 10.

This control is based on causing internal reflection between the boundaries of the relevant layers, where the internal reflection is typically caused by TIR which is sustained as long as the light L is injected into the relevant layer at an angle to the normal of the panel (layer) which is larger than the critical angle at a light-injection site of the panel. The critical angle is however fixed, or at least known at each moment, and TIR is hence governed by the refractive indexes of the layer receiving the light and the surrounding material. As is well-known to the skilled person, it is possible to maintain TIR in a layer by selecting a certain ratio between the refractive indexes of the layer and the material surrounding the layer. By modifying this ratio, TIR can be sustained for obtaining a reflective boundary like 8a, 8b and TIR can be broken for obtaining an opening like A1.

Figure 4:
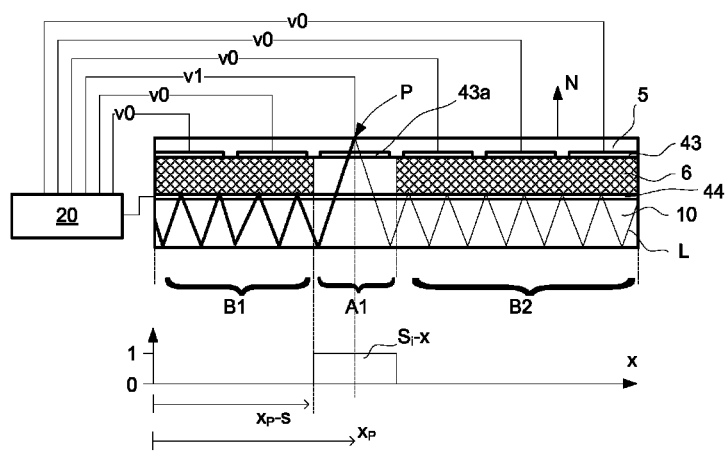
FIG. 4 illustrates a second embodiment of the touch-sensing apparatus, where a difference in refractive indexes is used for obtaining the reflective boundary.

With reference to FIG. 4 an embodiment using control of refractive indexes for realizing the selective control of the reflective boundary 8a, 8b is illustrated, where the first layer 6 is made of an optoelectric material having a variable index which is switchable between a first refractive index n1 and a second refractive index n2 in response to an applied voltage. The second refractive index n2 has a higher value than the first refractive index n1, such that TIR can be sustained in the second layer 10 at locations B1, B2 where the refractive index of the first layer 6 is n1, while TIR is broken at locations A1 where the refractive index of the first layer 6 is n2.

The voltage is applied by the control device 20 acting as a voltage controller, applying varying voltages v0, v1 to segmented electrodes 43 arranged on one side of the first layer 6 which interact with a base electrode 44 arranged on an opposite side of the first layer 6. The electric field induced by the electrodes 43, 44 in first layer 6 is controlled to vary over the time across the area of the first layer 6, such that a region of the first layer 6 defining the opening A1 has the higher refractive index n2 allowing light to enter the first layer 6 from the second layer 10, while remaining regions B1, B2 of the first layer 6 have the lower refractive index n1 for maintaining TIR in the second layer 10.

The region of increased refractive index n2, i.e. the opening A1, is transferred in the x-direction in the manner described above in connection with FIGS. 1 and 2.

Like in the embodiment using a spectrum controllable reflective polarizer, when the opening A1 is to be located at a certain position $x_P$ along the x-direction, a voltage v1 is applied to a specific electrode 43a of the segmented electrodes 43 that spatially corresponds to the location $x_P$ of the opening A1, thus increasing the refractive index from n1 to n2 at the location $x_P$. No voltage v0 is applied to the remainder of the segmented electrodes 43.

Since the spatial distribution of the segmented electrodes 43 is known, applying a voltage to one specific electrode to the next specific electrode in a sequential manner may generate a signal profile like the signal profile $S_i$-x described above. Here as well as in other embodiments, the position $x_P$ along the x-axis can be taken as the average position of the local increase of $S_i$-x along the x-axis, though it is possible to use the position $x_P$-s indicative of the end of the opening A1 that faces the incoupling site 13.

The electrodes and voltages can in this embodiment be applied in a manner similar with the embodiment of FIG. 3.

The electrodes 43, 44 are arranged to transmit the light L and, as the skilled person realizes, there are numerous suitable optoelectric materials that can be used for generating the described difference of refractive indexes. For purpose of describing such other materials patent documents WO2005/064365, WO2002/065177, WO2002054146 and WO2000/011515 are incorporated by reference.

Figure 5A:
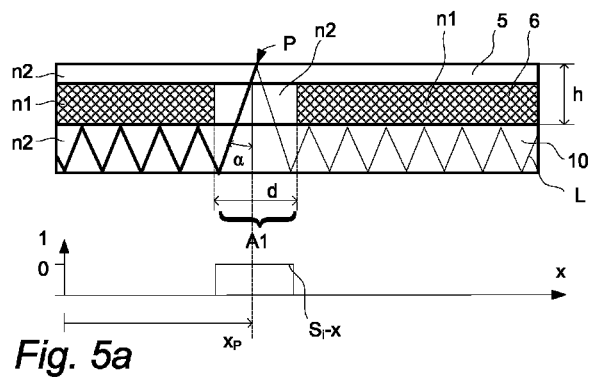
FIGS. 5a-5f illustrate alternative embodiments using a difference in refractive indexes for obtaining the reflective boundary.

With reference to FIG. 5a the embodiment of FIG. 4 is schematically shown for illustrating the various refractive indexes in the different layers. As can be seen, the touch layer 5, the second layer 10 and the region of the first layer 6 defining the opening A1 each have the higher refractive index n2, while regions of the first layer 6 not defining the opening A1 have the lower refractive index n1.

Here as well as in the following embodiments, any parts having the higher refractive index n2 must not necessarily have the exact same value of the higher refractive index n2; a refractive index high enough to sustain (or break in dependence of requirement) TIR suffices. The same applies for the lower refractive index n1.

n1 and n2 are chosen such that total internal reflection of the light L is maintained within the second layer 10 until the light L reaches the opening A1, where it enters the first layer 6, enters the touch layer 5 and impinges on the touch surface. After impinging on the touch surface the light L may be attenuated by any touching object, before it is reflected back towards the second layer 10 where the light L, again, propagates by TIR towards the light detection arrangement. In other words, the reflective boundary between the first layer 6 and the second layer 10 is accomplished by the difference in the refractive indexes n1 and n2.

The width d of the opening A1 is preferably determined as d=2·h·tan α, where h is the distance between the touch surface 4 and the reflective boundary 8a, 8b, and α is the angle between the direction of the light L incident on the touch surface 4 and the normal N of the touch surface 4. Also, the light is in this and other embodiments preferably injected, e.g. by selecting a proper width of the light, such that it impinges on the reflective boundary at distances less than the width of the opening.

Other embodiments for generating an opening by varying refractive indexes of the layers are shown in FIGS. 5b-5f. In these embodiments the layer with the variable refractive index can be controlled in a manner similar to the control of the first layer 6 of FIG. 4, and can include a corresponding arrangement and control of electrodes.

Figure 5B:
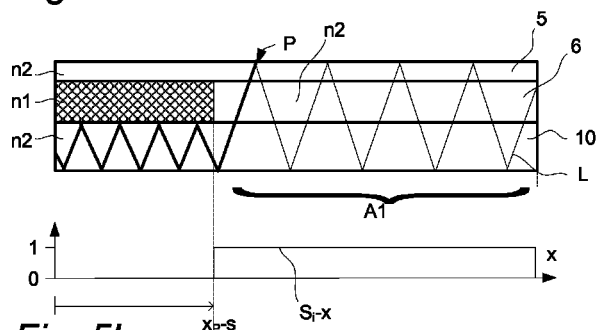

With reference to FIG. 5b, it can be seen that the opening A1 exhibiting the higher refractive index n2 may extend from a first variable position defined by $x_P$-s to the end (in the x-direction) of the panel. Accordingly, in this embodiment, after the light L is injected into the second layer 10, the light L propagates in the second layer 10 by TIR between the opposite surface and the reflective boundary formed between the first 6 and the second layer 10. When the light L reaches the point $x_P$-s where first layer 6 has the higher refractive index n2, the light L continues propagating by TIR between the touch surface and the opposite surface. In this embodiment, the outcoupling site of the panel can be arranged on any or all of the touch layer, the first layer and the second layer.

More particularly, at the start of each sensing instance the opening A1 covers the full surface of the panel. The opening A1 is then continuously decreased until it is fully "removed" (i.e. there is no opening) at the outcoupling site, which also marks the end of a current sensing instance. At the beginning of each sensing instance a touch on the touch surface always results in a local decrease of the signal profile $S_t$-y at a position along the y-axis that corresponds to the y-position of the touch. However, as soon as the refractive index in the first layer 6 is increased to n2 at the location P of the touch, the light can no longer reach the touch-location P and the touch cannot cause any attenuation, which results in a disappearance of the local decrease of the signal profile $S_t$-y. The location P of the touch along the x-direction is then determined as the location of the specific segmented electrode which activation (appliance of voltage) caused the disappearance of the local decrease of the signal profile $S_t$-y.

When multiple touches are aligned in the x-direction, the $S_t$-y signal will include attenuation from each aligned touch at the beginning of every sensing instance. In this case, every time the refractive index is increased at a touch-location P the $S_t$-y-signal experiences a certain increase in signal level. The very moment the signal level is increased to the certain level (which may be empirically determined), the momentary location of the increase in refractive index corresponds to the location P of the touch. Thus, by monitoring how $S_t$-y is increased in a step-like manner, each location of a number of aligned touches may be determined.

From this embodiment, it is clear that the light L impinged on the touch surface may propagate in the first layer 6 as well as in the second layer 10 and in the touch layer 5 towards the light detection arrangement after the opening A1 has been reached. It is also possible to omit the touch layer 5 such that light impinges on a top surface of the first layer 6 instead of impinging on the touch surface of the touch layer 5.

Furthermore, it is also possible to start each sensing instance with no opening at all such that the reflective boundary covers the full surface of the panel, and then initiate and continuously increase an opening until it fully covers the panel which marks the end of a current sensing instance. In this case, the signal profile $S_t$-y will exhibit a local decrease when the opening reaches a location of a touch, and in case several touches are aligned in the x-direction, there will be a certain level of decrease each time the opening reaches an aligned touch.

Figure 5C:
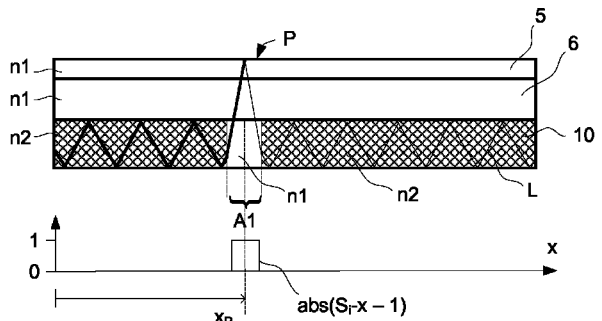

With reference to FIG. 5c another embodiment is illustrated where the refractive index is varied within the second layer 10. Here, the opening A1 is formed in the second layer 10 by decreasing the refractive index at the location of the opening A1, while other parts of the second layer 10 have the higher refractive index n2. The first layer 6 and the touch layer 5 each have the lower refractive index n1 and the light L is propagated by TIR in the second layer 10 until it reaches the opening A1. When the opening A1 is reached, the light L can enter the first layer 6, enter the touch layer 5 and impinge on the touch surface where it is reflected back towards the second layer 10 for further propagation towards the outcoupling site.

A touch causing an attenuation of the light L results in this embodiment in a decreased signal level in $S_t$-y the very moment the location P of the touch corresponds to the location $x_P$ of the opening A1 having the lower refractive index n1. Since the exemplified optoelectric material exhibits an increase of the refractive index in response to an applied voltage, and since it often is desirable to identify the location $x_P$ of the opening A1 with a positive signal, a signal profile defined by the absolute value of ($S_t$-x-1) can be used.

Figure 5D:
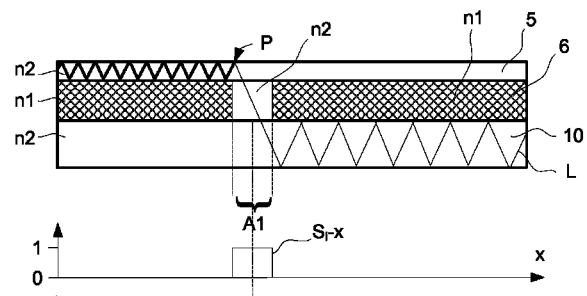

With reference to FIG. 5d another embodiment is illustrated where the refractive index is varied within the first layer 6. Here, the opening A1 is formed in the first layer 6 by increasing the refractive index to n2 at the location of the opening A1. Parts of the first layer 6 not comprising the opening A1 have the lower refractive index n1, while the touch layer 5 and the second layer 10 each have the higher refractive index n2. The light L is introduced in the touch layer 5 and propagates by TIR in the touch layer 5 until it reaches the opening A1. When the opening A1 is reached the light L can enter the second layer 10 via the opening and propagate by TIR in the second layer 10 towards the outcoupling site.

From the above described propagation of light it follows that light attenuated by the touch may reach the second layer 10 (and outcoupling site) when the opening A1 passes below the location P of the touch at location $x_P$. In a manner similar with previous embodiments, the location of a touch can be determined by the momentary location $x_P$ of the opening A1 when the signal profile $S_t$-y exhibits a decreased signal level that characterizes a touch.

In the embodiment of FIG. 5d it is possible to introduce the light in the second layer 10, allow the light to enter the touch layer 5 via the opening A1 and propagate in the touch layer towards an outcoupling site.

Figure 5E:
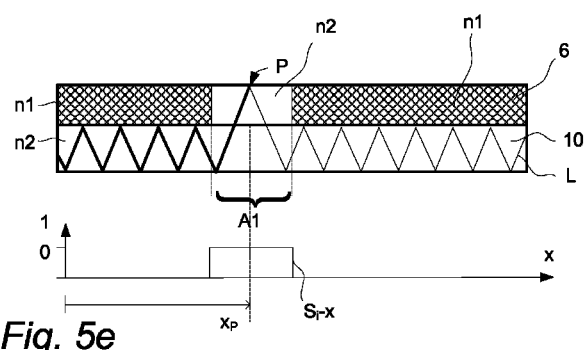

With reference to FIG. 5e another embodiment is illustrated. In comparison with the embodiment of FIG. 5a, the touch layer has been removed and a top surface of the first layer 6 acts as the touch surface, while other components and the method used for determining the location P remain the same.

In a corresponding manner the embodiments of e.g. FIGS. 5b and 5c can be implemented without the touch layer, such that the first layer defines the touch surface.

Figure 5F:
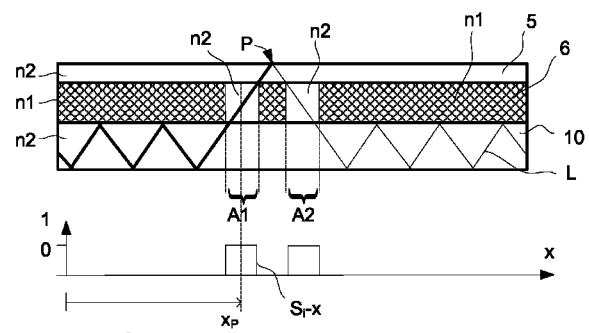

With reference to FIG. 5f still another embodiment is illustrated, where two openings A1, A2 are formed in the first layer 6. The openings A1, A2 have the higher refractive index n2 while remaining parts of the first layer 6 have the lower refractive index n1. The touch layer 5 and the second layer 10 each have the higher refractive index n2.

The light L is introduced in the second layer 10 and propagates by TIR in the second layer 10 until it reaches the first opening A1 where it enters the first layer 6, enters the touch layer 5 and impinges on the touch surface. The impinged light L is reflected back towards the second opening A2, passes the second opening A2, enters the second layer 10 and propagates by TIR in the second layer 10 and towards the outcoupling site.

The openings A1, A2, are transferred in the x-direction and are separated by a fixed distance. More particularly, the distance between the openings A1, A2 and the widths of the openings A1, A2 can be chosen such that all or most of the light L impinged on the touch surface is reflected back for further propagation in the second layer 10. The exact values of the distance/width may be empirically determined, as they depend on the wavelength of the light L, how thick each of the layers is, materials used for the layers etc. One advantage with this embodiment includes a possibility to prevent some or all of the light scattered at the location P from entering the second layer 10.

The described embodiments for controlling the opening share a common advantage when the apparatus is used together with an anti-glare surface applied on the touch layer. The advantage lies in a reduced detection difficulty caused by the anti-glare causing the light to spread out in the touch layer instead of propagating in a collimated beam. The spreading of the beam occurs in each reflection in the touch surface. Several reflections result in a light-beam with reduced intensity in the part of the light that continues propagating towards the outcoupling site. In the present apparatus this effect is strongly reduced as the light does not at all times propagate by reflection on the full touch surface. Instead, the light propagates by reflection at the touch surface for a very short distance (FIGS. 5a, 5c, 5e and 5f) or, when using a time distributed average of the opening, for half the distance the touch surface (FIGS. 5b and 5d).

Generally, the layers of the panel may be made of, depending on layer and embodiment, any controllable reflective polarizer/specular material/optoelectric material. For layers not forming the opening(s) any material that transmits a sufficient amount of light in the relevant wavelength range to permit a sensible measurement of transmitted energy can be used. Such material includes glass and polycarbonates. The various layers can be attached to each other with e.g. optically clear glue.

As has been mentioned, there are numerous other ways for coupling light into and coupling light out from the panel that might be used just as well. Some suitable techniques can be found in patent documents U.S. Pat. No. 4,254,222, U.S. Pat. No. 6,972,753, U.S. Pat. No. 7,432,893, US2006/0114237, US2007/0075648, WO2009048365 and U.S. provisional application No. 61/129,373, which documents describe various kinds of incoupling and outcoupling of light as well as operations for obtaining one or more signals that are indicative of the spatial distribution of light in a light transmissive panel. Accordingly, the light may e.g. be coupled into and/or coupled out from any of the touch surface and the opposite surface.

Also, the light may be propagated in the panel as substantially straight beams, as diverging/converging/collimated beams, as coded beams using multiplexing etc. The light can be generated by one or more light sources, which can be any type of device capable of emitting light in a desired wavelength range, for example a diode laser, a VCSEL (vertical-cavity surface-emitting laser), or alternatively an LED (light-emitting diode), an incandescent lamp, a halogen lamp, etc. Moreover, the light in the various embodiments is schematically illustrated, and the angle between the direction of the light incident on the touch surface and the normal of the touch surface may in practice be much greater.

Also, the opening may be transferred in a direction along the light, i.e. in the x-direction, but might for the various embodiments just as well be transferred in the opposite direction. For the embodiments of FIGS. 5b and 5d, a touch is then, depending on the direction of the light, indicated either by an increase or by a decease in the $S_i$-y signal profile.

The energy of the light may be measured by any type of light detector capable of converting light into an electrical signal. Such a light detector may have any number of light-sensitive elements and may thus be a 0-dimensional, 1-dimensional (1D) or 2-dimensional (2D) detector.

Figure 6:
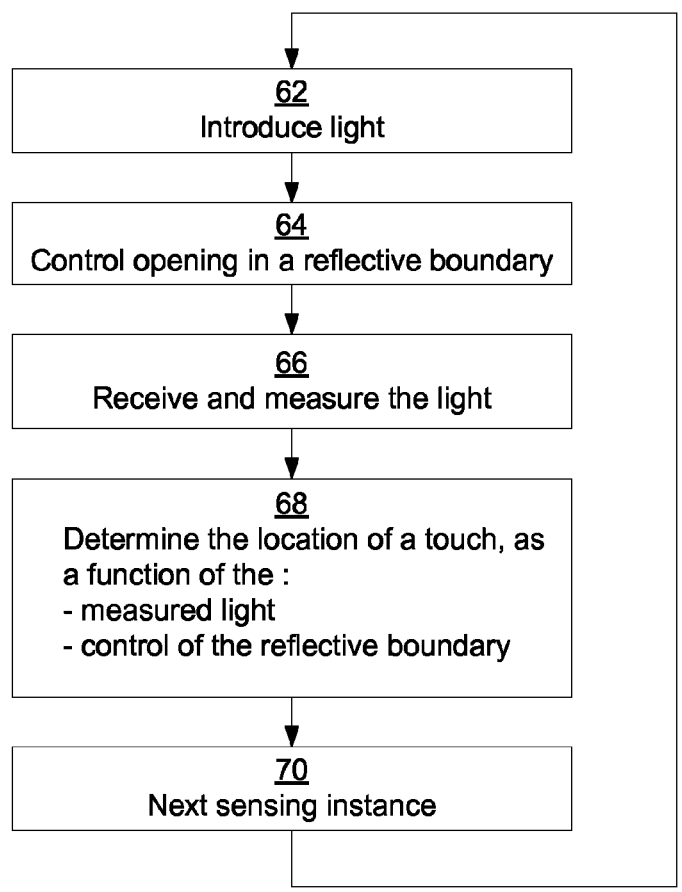
FIG. 6 is a flow diagram illustrating an embodiment of a method for determining a location of at least one object on a touch surface, performed by the apparatus of FIG. 1.

From the description above it follows that the apparatus 1 implements a method for determining the location P of the object 3 on the touch surface 4. With reference to FIG. 6, the method accordingly includes the step 62 of introducing the light L into either the touch layer 5, the first layer 6 or the second layer 10 for propagation by internal reflection.

In the next step 64, the reflective boundary 8a, 8b is selectively controlled such that the light-transmissive opening A1 is formed in the reflective boundary 8a. 8b, which allows any light L attenuated by a touch to pass the opening A1 and propagate towards the outcoupling site 14.

In the next step 66, the intensity of any of the light L that was attenuated at the touch surface is received and measured by the light detection arrangement 18.

In the next step 68, the processor unit 22 determines, when the object 3 touches the touch surface 4 and thereby attenuates the light L impinged on the touch surface 4, the location P as a function of the measured light intensity and the selective control the reflective boundary 8a, 8b. In this context, control of the boundary 8a, 8b is equivalent with control of the opening A1 which includes the transfer of the opening A1.

In the final step 70 the opening A1 or, depending on embodiment, an edge portion of the opening A1 has been moved the full width of the panel and the implemented method is repeated in an iterative manner.

Software instructions, i.e. a computer program code for carrying out the method may for development convenience be written in a high-level programming language such as Java, C, and/or C++ but also in other programming languages, such as, but not limited to, interpreted languages. The software instructions can also be written in assembly language or even microcode to enhance performance and/or memory usage. It will be further appreciated that the functionality of any or all of the functional steps performed by the apparatus may also be implemented using discrete hardware components, one or more application specific integrated circuits, or a programmed digital signal processor or microcontroller.

With reference to FIG. 2, the apparatus 1 can include a computer-readable medium 29 storing processing (software) instructions that, when executed by the processor unit 22, performs the method implemented in the apparatus 1.

The method implemented in the apparatus can of course also include various processing steps performed on the obtained signal profiles $S_i$-x and $S_i$-y.

For example, the signal profiles may be processed for determining a plurality of touch locations simultaneously present on the touch surface. The signal profiles may be processed for noise reduction using standard filtering techniques, e.g. low-pass filtering, median filters, Fourier-plane filters, etc. Furthermore, if the energy of the emitted light is measured in the apparatus, the signal profiles may be compensated for temporal energy fluctuations in the illumination arrangement. Furthermore, the signal profiles may contain sensor readings from outside the region of interest, e.g. outside a sensing area of the panel. Thus, the signal profiles may be pre-processed by extracting relevant parts thereof. Furthermore, the signals may be rectified, i.e. converted to have equidistant sampling distance in the panel coordinate system. Such a rectification may include interpolating each measurement signal with a non-linear angle variable, resulting in a data set with samples that are evenly distributed over the panel.

The signal profiles may also be used for determining background signal profiles representing a state where no touch is present on the touch surface. Such background signal profiles can then be updated in various ways and can be applied on a current set of the signal profiles for removing the effect of various contaminations on the touch surface, for example by dividing the current signal profiles with the background signal profiles. The resulting signal profiles can then be used for determining the location of the touch.

It shall be noted that the illustrated signal profile $S_i$-y derived by measuring the intensity of light is schematic and may exhibit various other decreases in signal levels, e.g. due to contaminations on the touch surface and impurities in the layer in which the light propagates. However, known filtering techniques may solve this problem.

Although various embodiments of the invention have been described and shown, the invention is not restricted thereto, but may also be embodied in other ways within the scope of the subject-matter defined by the above described apparatus. In particular, the invention may be implemented by using other techniques for controlling a reflective boundary such that a light-transmissive, transferable opening is formed in the reflective boundary. Also, the invention may be implemented by using numerous other ways for coupling light into and out from the panel, and by using additional signal processing techniques operating on the measured light intensity and the selective control of the reflective boundary.

The invention claimed is:

1. An apparatus for determining a location of at least one object on a touch surface, the apparatus comprising:
    a light transmissive panel defining the touch surface and comprising a first layer and a second layer arranged intermediate the touch surface and an opposite surface,
    a controllable reflective boundary formed between the first layer and the second layer,
    an illumination arrangement configured to introduce light into the panel for propagation by internal reflection and for allowing the light to impinge on the touch surface,
    an electrical control device configured to selectively control the reflective boundary for forming a light-transmissive opening in the reflective boundary, such that at least a portion of the introduced light passes between the first layer and the second layer via the opening,
    a light detection arrangement configured to receive and measure an intensity of the light passed via the opening and impinged on the touch surface, and
    a processor unit configured to, when the object touches the touch surface and thereby attenuates the light passed via the opening and impinged on the touch surface, determine the location as a function of the measured light intensity and the selective control of the reflective boundary,
    wherein the first layer includes a refractive index different from a refractive index of the second layer, for forming the controllable reflective boundary, and
    wherein the control device is configured to form the opening by locally decreasing the difference in refractive indices of the first layer and the second layer.

2. The apparatus according to claim 1, wherein the first layer includes a lower refractive index than the second layer, for forming the controllable reflective boundary.

3. The apparatus according to claim 1, wherein the first layer comprises a variable refractive index.

4. The apparatus according to claim 3, wherein the opening is formed by a local increase of the refractive index of the first layer.

5. The apparatus according to claim 1, wherein the second layer comprises a variable refractive index.

6. The apparatus according to claim 1, wherein the opening is formed by a local decrease of the refractive index of the second layer.

7. The apparatus according to claim 1, wherein a reflective layer is arranged between the first layer and the second layer, for forming the controllable reflective boundary.

8. The apparatus according to claim 1, wherein the control device is configured to systematically transfer the opening across the touch surface.

9. The apparatus according to claim 1, wherein the control device is configured to systematically transfer the opening in a direction parallel with a path of the light from the illumination arrangement to the light detection arrangement.

10. The apparatus according to claim 1, wherein the opening is elongated and extends between two opposite sides of the panel.

11. An apparatus for determining a location of at least one object on a touch surface, the apparatus comprising:
    a light transmissive panel defining the touch surface and comprising a first layer and a second layer arranged intermediate the touch surface and an opposite surface,
    a controllable reflective boundary formed between the first layer and the second layer,
    an illumination arrangement configured to introduce light into the panel for propagation by internal reflection and for allowing the light to impinge on the touch surface,
    an electrical control device configured to selectively control the reflective boundary for forming a light-transmissive opening in the reflective boundary, such that at least a portion of the introduced light passes between the first layer and the second layer via the opening,
    a light detection arrangement configured to receive and measure an intensity of the light passed via the opening and impinged on the touch surface, and
    a processor unit configured to, when the object touches the touch surface and thereby attenuates the light passed via the opening and impinged on the touch surface, determine the location as a function of the measured light intensity and the selective control of the reflective boundary,
    wherein the opening is elongated and extends between two opposite sides of the panel, and
    wherein a width of the elongated opening is larger than a distance defined by:
        the distance between the reflective boundary and the touch surface, and
        an angle between a normal direction of the touch surface and the direction of the light impinged on the touch surface.

12. The apparatus according to claim 1, wherein the control device is configured to selectively control the reflective boundary such that a light-transmissive, further opening is formed in the reflective boundary, allowing the light impinged on the touch surface to pass between the first layer and the second layer via the further opening.

13. The apparatus according to claim 1, wherein the processor unit is configured to determine the location of the at least one object as a function of a momentary location of the opening.

14. The apparatus according to claim 1, wherein the panel comprises a touch layer and wherein the first layer and the second layer are arranged underneath the touch layer.

15. The apparatus according to claim 1, wherein
the second layer is arranged underneath the first layer,
the illumination arrangement is configured to introduce light into the second layer, and
the control device is configured to selectively control the reflective boundary such that the opening allows the light to enter the first layer from the second layer and impinge on the touch surface.

16. The apparatus according to claim 15, wherein the control device is configured to selectively control the reflective boundary such that the light impinged on the touch surface is allowed to enter the second layer from the first layer, for further propagation in the second layer and towards the light detection arrangement.

17. The apparatus according to claim 15, wherein the control device is configured to selectively control the reflective boundary such that the light impinged on the touch surface is allowed to propagate in the first layer and towards the light detection arrangement.

18. The apparatus according to claim 1, wherein the panel is configured to allow propagation of the light by total internal reflection.

19. A method in an apparatus for determining a location of at least one object on a touch surface, the apparatus comprising a light transmissive panel defining the touch surface and comprising a first layer and a second layer arranged intermediate the touch surface and an opposite surface, and a controllable reflective boundary formed between the first layer and the second layer, the method comprising:
introducing light into the panel for propagation by internal reflection and for allowing the light to impinge on the touch surface;
electrically controlling the reflective boundary for forming a light-transmissive opening in the reflective boundary, such that at least a portion of the introduced light passes between the first layer and the second layer via the opening;
receiving and measuring an intensity of the light passed via the opening and impinged on the touch surface; and
determining, when the object touches the touch surface and thereby attenuates the light passed via the opening and impinged on the touch surface, the location as a function of the measured light intensity and the selective control of the reflective boundary,
wherein the first layer includes a refractive index different from a refractive index of the second layer, for forming the controllable reflective boundary, and
wherein the opening is formed by locally decreasing the difference in refractive indices of the first layer and the second layer.

20. A tangible computer-readable medium storing processing instructions that, when executed by a processor, performs the method according to claim 19.

* * * * *